US011681574B2

(12) United States Patent
Ertl et al.

(10) Patent No.: US 11,681,574 B2
(45) Date of Patent: *Jun. 20, 2023

(54) METHOD AND SYSTEM FOR REAL-TIME AND SCALABLE ANOMALY DETECTION AND CLASSIFICATION OF MULTI-DIMENSIONAL MULTIVARIATE HIGH-FREQUENCY TRANSACTION DATA IN A DISTRIBUTED ENVIRONMENT

(71) Applicant: Dynatrace LLC, Waltham, MA (US)

(72) Inventors: Otmar Ertl, Linz (AT); Ernst Ambichl, Altenberg (AT)

(73) Assignee: Dynatrace LLC, Waltham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/857,670

(22) Filed: Jul. 5, 2022

(65) Prior Publication Data
US 2022/0334907 A1 Oct. 20, 2022

Related U.S. Application Data

(63) Continuation of application No. 17/078,594, filed on Oct. 23, 2020, now Pat. No. 11,397,628, which is a
(Continued)

(51) Int. Cl.
*G06F 11/00* (2006.01)
*G06F 11/07* (2006.01)
(Continued)

(52) U.S. Cl.
CPC ........ *G06F 11/0709* (2013.01); *G06F 11/079* (2013.01); *G06F 11/0754* (2013.01);
(Continued)

(58) Field of Classification Search
CPC ............... G06F 11/0709; G06F 11/079; G06F 11/0754; G06F 11/076; G06F 11/0766;
(Continued)

(56) References Cited

U.S. PATENT DOCUMENTS 8,234,631 B2 7/2012 Greifeneder et al.
8,713,190 B1 4/2014 Goodall et al.
(Continued)

OTHER PUBLICATIONS

Ludmila Cherkasova et al. "Anomaly? application change? or workload change? towards automated detection of application performance anomaly and change", Dependable Systems and Networks with FTCS and DCC, IEEE International Conference (2008).

*Primary Examiner* — Marc Duncan
(74) *Attorney, Agent, or Firm* — Harness, Dickey & Pierce, P.L.C.; Timothy D. MacIntyre

(57) ABSTRACT

A system and method for the distributed analysis of high frequency transaction trace data to constantly categorize incoming transaction data, identify relevant transaction categories, create per-category statistical reference and current data and perform statistical tests to identify transaction categories showing overall statistically relevant performance anomalies. The relevant transaction category detection considers both the relative transaction frequency of categories compared to the overall transaction frequency and the temporal stability of a transaction category over an observation duration. The statistical data generated for the anomaly tests contains next to data describing the overall performance of transactions of a category also data describing the transaction execution context, like the number of concurrently executed transactions or transaction load during an observation period. Anomaly tests consider current and reference execution context data in addition to statistic performance data to determine if detected statistical performance anomalies should be reported.

26 Claims, 7 Drawing Sheets

Related U.S. Application Data continuation of application No. 15/997,734, filed on Jun. 5, 2018, now Pat. No. 10,817,358.

(60) Provisional application No. 62/523,859, filed on Jun. 23, 2017.

(51) Int. Cl.
*G06F 11/34* (2006.01)
*G06F 11/30* (2006.01)

(52) U.S. Cl.
CPC ...... *G06F 11/3006* (2013.01); *G06F 11/3409* (2013.01); *G06F 11/3419* (2013.01); *G06F 11/3452* (2013.01); *G06F 11/3495* (2013.01); *G06F 11/0766* (2013.01); *G06F 2201/87* (2013.01)

(58) Field of Classification Search
CPC ............. G06F 11/3006; G06F 11/3419; G06F 11/3409; G06F 11/3452; G06F 11/3495; G06F 11/0745

See application file for complete search history.

(56) References Cited

U.S. PATENT DOCUMENTS

| | | |
|---|---|---|
| 8,938,533 B1 | 1/2015 | Bansal et al. |
| 10,817,358 B2 | 10/2020 | Ertl et al. |
| 11,397,628 B2 * | 7/2022 | Ertl ................ G06F 11/3433 |
| 2009/0271511 A1 | 10/2009 | Peracha |
| 2014/0052841 A1 | 2/2014 | Kanemasa et al. |
| 2015/0032752 A1 | 1/2015 | Greifeneder et al. |
| 2017/0039554 A1 | 2/2017 | Greifeneder et al. |
| 2017/0155674 A1 | 6/2017 | Seo et al. |
| 2018/0107528 A1 | 4/2018 | Vizer et al. |

* cited by examiner

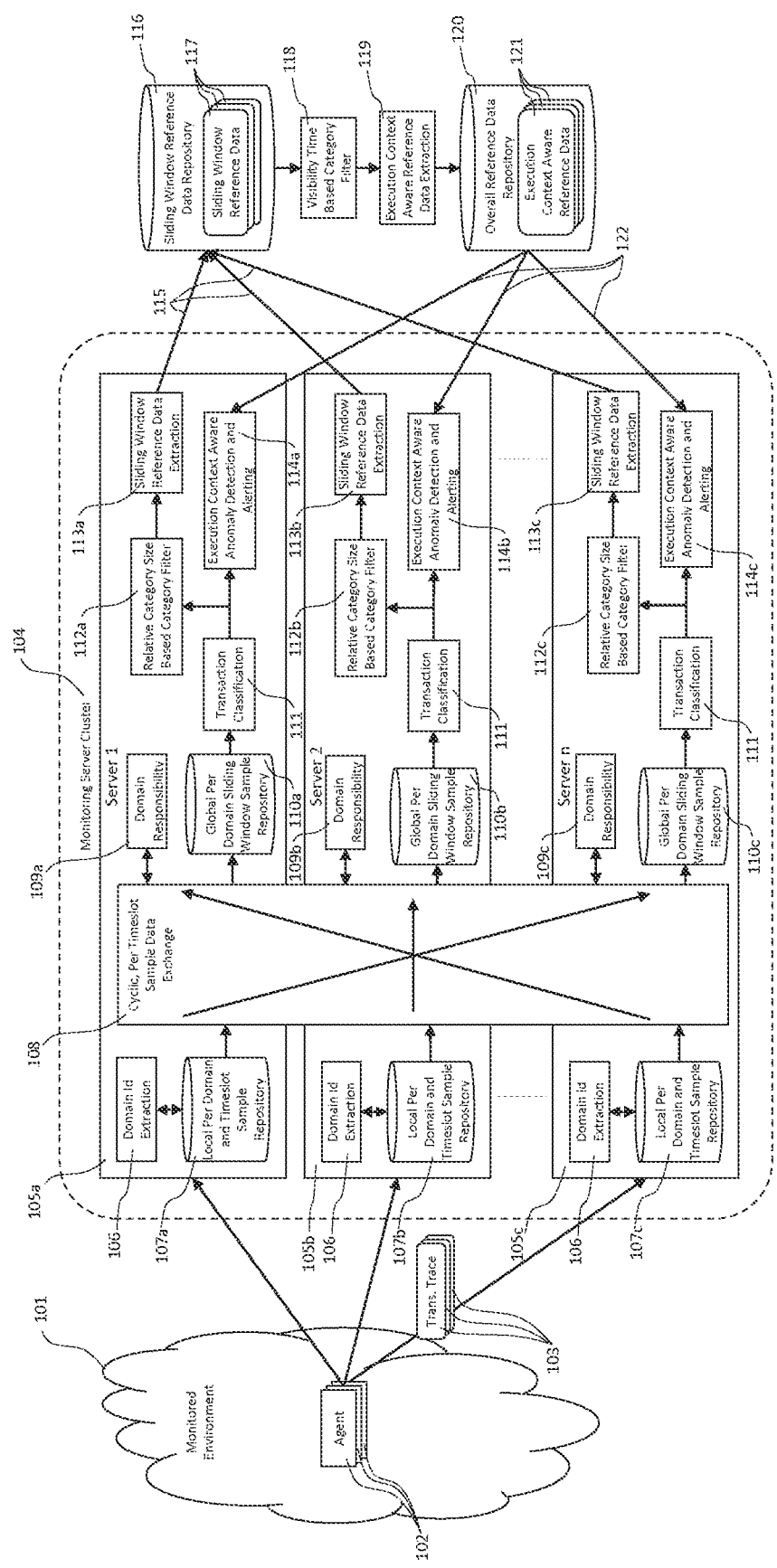

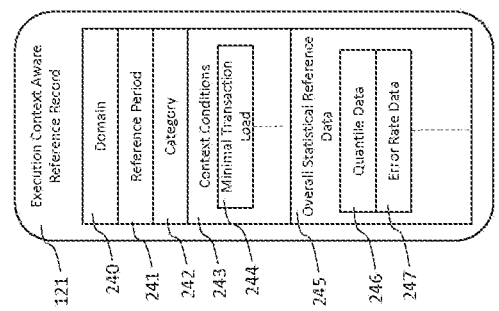
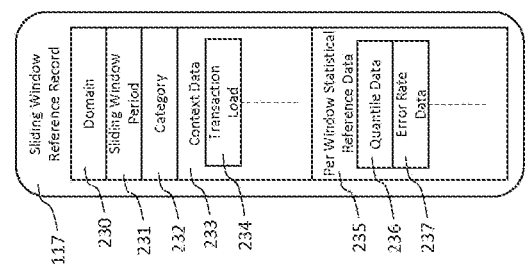
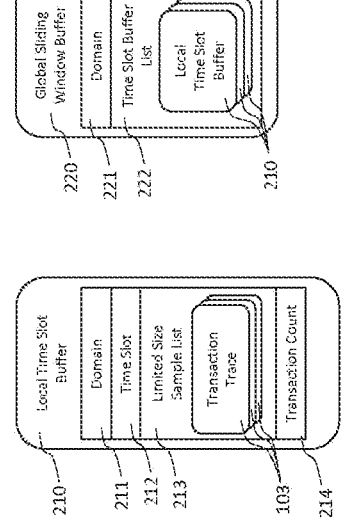
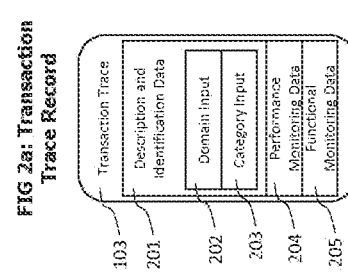
FIGS 2A-E

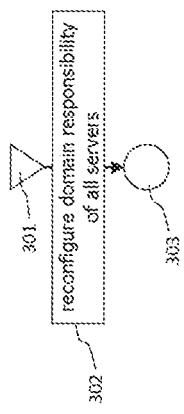
FIG 3: Cluster Maintenance Processes

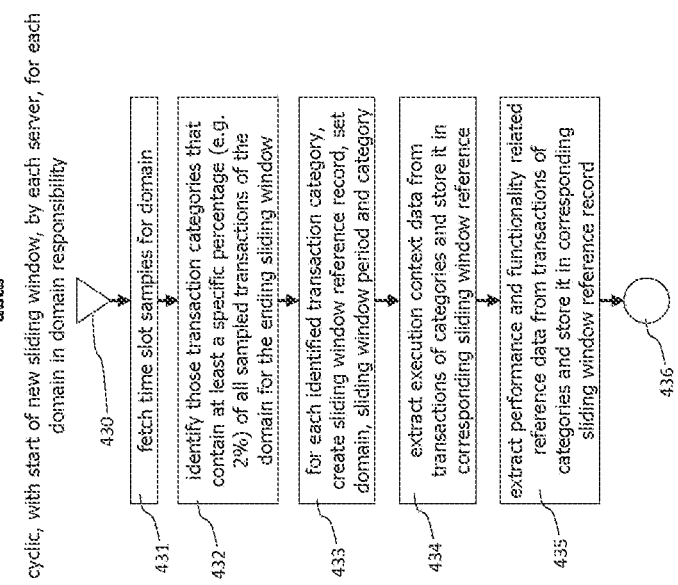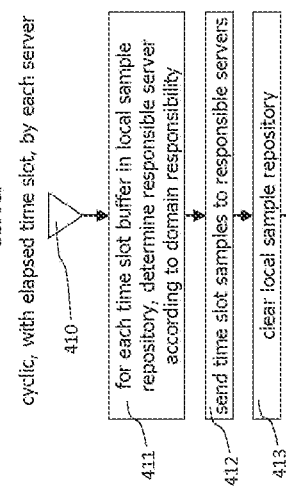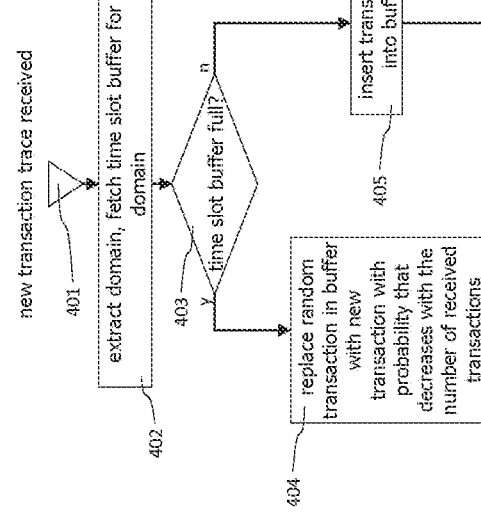

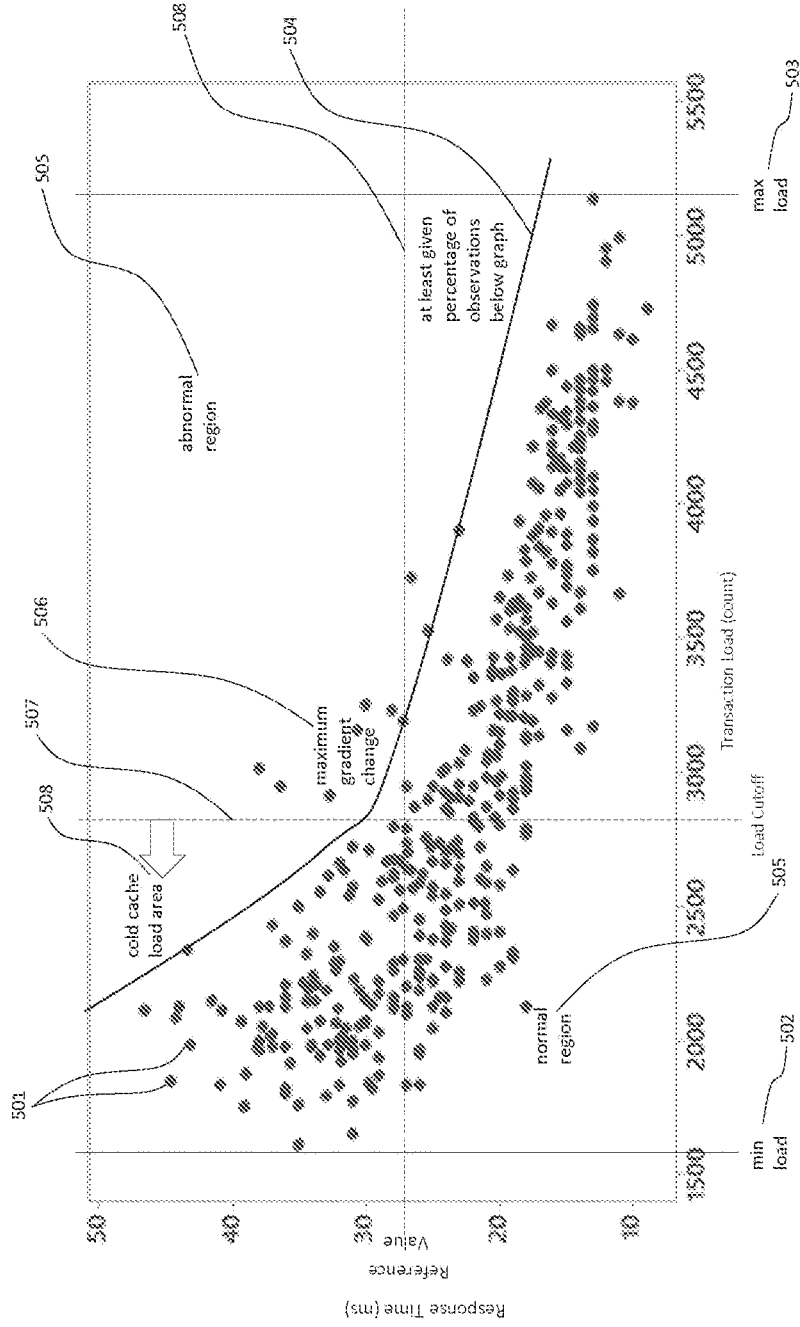

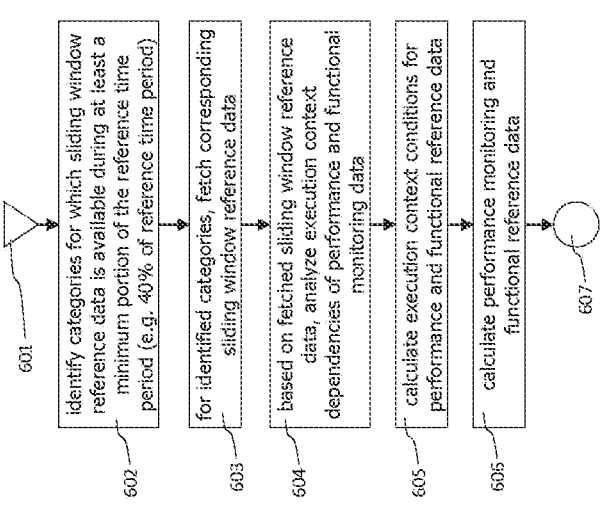
FIG 6: Cyclic Creation of Execution Context Aware Reference Data

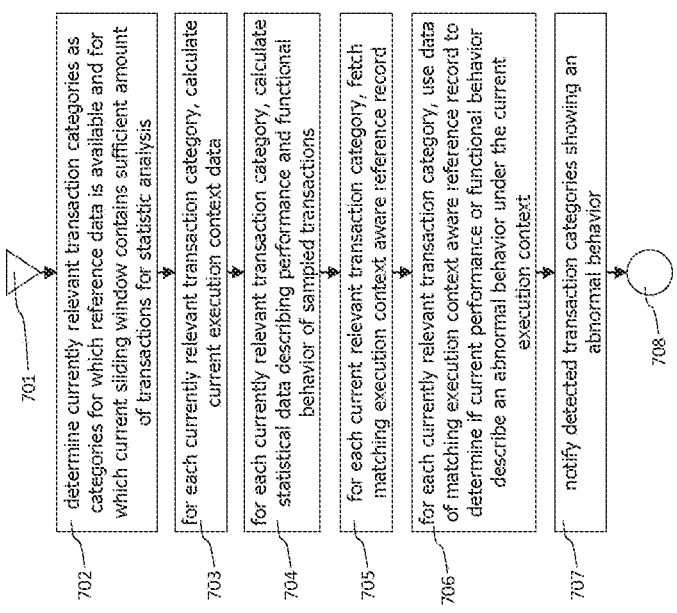

METHOD AND SYSTEM FOR REAL-TIME AND SCALABLE ANOMALY DETECTION AND CLASSIFICATION OF MULTI-DIMENSIONAL MULTIVARIATE HIGH-FREQUENCY TRANSACTION DATA IN A DISTRIBUTED ENVIRONMENT

CROSS-REFERENCE TO RELATED APPLICATIONS

This application is a continuation of U.S. patent application Ser. No. 17/078,594, filed on Oct. 23, 2020, which is a continuation of U.S. patent application Ser. No. 15/997,734 filed on Jun. 5, 2018. This application claims the benefit of U.S. Provisional Application No. 62/523,859, filed on Jun. 23, 2017. The entire disclosures of each of the above applications are incorporated herein by reference.

FIELD

The invention generally relates to the identification and reporting of anomalous performance behavior of monitored transactions and specifically to the combined evaluation of statistical data describing the performance behavior of groups of similar transactions and data describing the execution context of those transactions to determine if anomaly alerts should be raised.

BACKGROUND

Modern transaction tracing and monitoring systems are capable to monitor large applications that are designed to handle thousands of transaction requests per minute in a way that each transaction request creates an individual transaction trace record that describes performance and functional aspects of the transaction. Monitoring systems typically use clustered monitoring servers that cooperate to receive and process this large amount of monitoring data. The received monitoring data may be stored for later detailed analysis. Next to providing detailed data for a later analysis, those monitoring systems also continuously analyze the incoming transaction trace stream to assess the operating situation of the monitored application and to issue alerts if the operating situation indicates functional or performance problems affecting the majority of application users. Statistical methods are used for this continuous monitoring of the overall operating situation. Those statistical methods work best for input data for which similar behavior ca be expected. Therefore, the monitoring systems need to perform a real-time or near real-time and continuous categorization of monitoring transactions to identify categories of transactions that perform similar tasks under similar conditions. The statistical methods may then be applied on a per transaction category basis.

Different transaction execution conditions and tasks executed by transactions create a vast number of possible transaction categories which makes it impossible to monitor all those categories. As a consequence, monitoring systems continuously analyze incoming transaction streams to identify a limited number of transaction categories that subsume the highest number of transactions.

Next to transaction stream for which a homogeneous performance and functional behavior can be expected, the operation condition monitoring also requires historic statistic reference data describing observed historic operation condition. This historic reference data is then compared with current statistic data to determine if the current operation condition represents an anomaly. Monitoring systems typically create compacted statistical data out of current transaction trace data which is used as reference data for future observation periods.

Existing approaches as e.g. described in U.S. patent application Ser. No. 15/227,029, "Method And System For Real-Time, Load-Driven, Multidimensional And Hierarchical Classification Of Monitored Transaction Executions For Visualization And Analysis Tasks Like Statistical Anomaly Detection" by Greifeneder et al. which is included herein by reference in its entirety, fulfill the tasks of identifying most important categories, creating baseline data and performing anomaly tests to identify anomalous behavior on transaction category basis, but they still show shortcomings in some areas. First, they use a two-pass approach, where the first pass identifies important categories and the second pass scans monitored transaction traces to create reference data for those categories. The second pass needs to read and analyze large amount of data from a secondary storage like a hard disk, which makes the process slow and I/O intensive. Second, the identification of the important categories only considers the number of transactions matching a category, not their temporal distribution. As an example, this process would e.g. identify a category as important if all transactions of the category would be executed during very small fraction of a reference period (e.g. 10 minutes out of a reference period of one or two days). It is often desired to only consider those transaction categories as important which show a high transaction load over a longer observation period.

Another shortcoming of current approaches is that they do not consider overall operating conditions of the monitored application, like the concurrent transaction load. Prominent issues arising from this shortcoming are false alerts caused by the "cold cache" phenomenon. Typically, transaction execution performance is mostly independent of the current transaction load as long as a maximum number of concurrent transactions is not exceeded. An exception of this independence are low load scenarios where the number of parallel transactions is low compared to the capacity of the application. In such a situation, caches that are used to improve the performance of the application by e.g. reusing results of time consuming requests for multiple transactions are empty, and typically all or most transactions need to perform those time-consuming requests instead of using already available results. As a consequence, transaction executions in low-load scenarios are typically slower than in normal load scenarios. Monitoring system that do not consider this behavior are prone to generating false positive alerts.

Consequently, there is need for monitoring systems that overcome above shortcomings. This section provides background information related to the present disclosure which is not necessarily prior art.

SUMMARY

This section provides a general summary of the disclosure, and is not a comprehensive disclosure of its full scope or all of its features.

The disclosed technology is directed to the real-time, false-positive resistant identification of anomalies in the execution performance and functionality of high-volume and high-frequency streams of transaction trace data. The disclosed technology considers captured transaction context data and transaction execution frequency over time to identify important transaction categories, for which baseline reference data is created. Important transaction categories may be defined as those transaction categories with the highest transaction frequency. The created baseline reference data also considers dependencies between transaction performance and transaction execution conditions, like the number of concurrently executed transactions. The baseline reference data may be used to determine if currently measured transaction performance and execution conditions represent an anomaly.

The transaction trace data may be created by agents that are deployed to a monitored environment to monitor the execution of transactions and to provide the created monitoring data in form of transaction trace data. The agents may send the transaction trace data to a monitoring server or a set of monitoring server forming a monitoring server cluster. The monitoring server may first sample and filter the incoming transaction trace data to create a transaction trace stream with a maximum frequency that statistically represents the incoming transaction trace stream. The transaction traces of the condensed transaction trace stream are cyclically (e.g. every 1, 5 or 10 minutes) grouped and categorized to identify those transaction categories with the highest frequency in the current observation cycle. Category reference data considering the transactions of the current observation cycle is created per transaction category. This reference data contains statistics, like e.g. quantile estimates that statistically describe the performance of the transaction executions of current observation cycle, and data that describes the transaction execution conditions of the current observation cycle, like the number of concurrent transaction executions. The reference data for the current observation cycle or sliding window is stored in a persistent sliding window reference data repository. Persistent sliding window reference data representing multiple sliding windows is periodically processed to create new reference data representing a longer reference period (e.g. one hour, a day or a week). A first step of the processing identifies and filters those transaction categories that appear in at least a minimum fraction (e.g. 40%) of the sliding windows of the reference period to identify transaction categories that represent a significant portion of the transaction load over a longer period of time. The sliding window reference data of those transaction categories representing high transaction load over a longer period of time is processed to create overall reference data that represents the whole reference period.

As the different sliding window reference data records are typically recorded for different transaction load scenarios, multiple of those sliding window reference data records may be used to identify dependencies between transaction execution performance and concurrent transaction load. Those dependencies may be stored in the overall reference data.

Overall reference data describing a preceding reference period may be used to determine if current sliding window reference data describing the current transaction execution performance and concurrent transaction load represent an anomaly.

Some embodiments of the current disclosure may use the combined observations of transaction execution performance and concurrent transaction load described by the sliding window reference data of the reference period to determine if transactions of a specific category are affected by the "cold cache" effect. The "cold cache" effect describes that the execution time of transactions increases when the transaction load falls below a certain level. The reason for this increased transaction execution time are caches that are used to temporarily hold intermediate results that can be reused by different transactions and therefore decrease the execution time of transactions. With decreased transaction load, the efficiency of caches decreases, because in such low load scenarios those caches are empty or nearly empty and most transactions do not find intermediate results that can be used. Some embodiments may determine a load threshold which specifies the concurrent transaction load at which the "cold cache" effect dominates the transaction performance and only perform anomaly tests if the current load is higher than this "cold cache" threshold.

Other embodiments may use the sliding window reference data of the reference period to determine a function describing a dependency between concurrent transaction load and transaction performance. Those embodiments may use a given transaction load of a current sliding window data as input for this function to calculate corresponding performance reference values for the given transaction load. Those calculated reference parameters may then be used for anomaly tests.

Yet other embodiments may dynamically adapt the number of servers in the monitoring server cluster according to a current transaction trace load.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 provides a block diagram of a monitoring server cluster employing a distributed classification and anomaly detection system.

FIGS. 2*a-e* show data structures that may be used by the servers of a monitoring sever cluster to exchange current monitoring data, to accumulate current anomaly detection data and to store anomaly detection reference data.

FIG. 3 conceptually describes the process of updating a monitoring server cluster on events like adding or removing a server from the cluster.

FIGS. 4*a-d* provides flowcharts that describe processes to accumulate and sample incoming transactions on a receiving server, to concentrate the sampled transactions on a domain responsible server, to group the sampled and concentrated transactions into transaction categories and to create statistical data describing the performance and functionality related behavior of transactions in those categories.

FIG. 5 provides a chart that shows the dependency between performance measurements like transaction response times and execution conditions, like transaction load. The chart further describes the "cold cache" phenomenon.

FIG. 6 provides a flow chart of a process to create execution context aware reference data.

FIG. 7 contains a flow chart of a process that uses context aware reference data together with current anomaly detection data containing current execution context data to perform execution context aware anomaly detection.

Corresponding reference numerals indicate corresponding parts throughout the several views of the drawings.

DETAILED DESCRIPTION

Example embodiments will now be described more fully with reference to the accompanying drawings. The described embodiments are directed to the scalable analysis of incoming transaction monitoring data to simultaneously create reference data for future time periods and to perform anomaly checks on current transaction data using reference data form previous time periods.

The creation of the reference data includes the grouping of transactions into transaction categories and the identification of those transaction categories that represent at least a certain minimum percentage of the overall transactions during at least a certain minimum percentage of a reference period. Reference data may only be created for such identified transaction categories with continuous significant transaction load. The reference data for a specific transaction category may, in addition to statistical data that describes the performance and functional behavior of matching transactions, also contain data that describes dependencies between concurrent transaction load and transaction performance. This additional data that relates transaction load and expected transaction performance may be used to refine the anomaly checks to e.g. avoid false-positive alerts.

Referring now to FIG. 1 which provides a block diagram of those components of a monitoring system that perform the identification of transaction categories, the creation of reference data and the execution of tests to identify anomalies of current transaction executions in comparison to transaction executions from a past reference period. Other components that may be included in the monitoring system, like components that receive transaction trace fragments from agents to create end-to-end transaction trace data, or components that use data describing identified anomalies for further automated analysis processes like e.g. an automated identification of a root cause for identified anomalies, are not shown in the block diagram.

Agents 102 are deployed to a monitored environment 101 to monitor transaction executions performed within the monitored environment. The agents may be deployed by downloading executable agent code to computing systems of the monitored environment and by injecting the agent code into processes executed on those computing systems. The agents may instrument code executed by those processes by adding sensor code. The sensor code may detect the execution of transactions by the processes and create transaction trace data describing those transaction executions. The injection of agents into processes and the placement of sensor code may be performed using techniques for volatile modification of code during execution or loading of the code, like bytecode instrumentation or injection.

The agents may send created transaction trace data 103 to one monitoring server 105 of a monitoring server cluster 104, where the specific monitoring server to which a transaction trace is sent may be randomly chosen by the agent that recorded the transaction trace.

Each monitoring server 105a to 105c uses a domain id extraction unit to extract a domain identification from incoming transaction traces 103. A transaction domain may group transactions according to an overall offering of an application vendor, like e.g. the name of a server that is used by users of an application to address services provided by the application. The transaction domain may e.g. correspond to the part of an URL corresponding to and being part of a transaction trace that specifies the address of the server addressed by the URL. Example URLs may have the form "http://mycompany.com/search" or "http://mycompany.com/checkout". In both examples, "mycompany.com" specifies the server addressed by the URLs, which may also be used as domain identifier. The subsequent parts of the URLs "search" or "checkout" may be used to identify different services provided by transactions of the transaction domain "mycompany.com" and may later be used by the transaction classification module 111. The domain id extraction 106 analyzes incoming transaction traces, extracts a domain id, selects or creates a local time slot sample buffer 210 for the extracted domain identifier and adds the transaction trace to the sample list 213 of the local time slot buffer. The sample list 213 has a limited size and the process of replacing existing entries in a full sample list is performed in a way that the probability of being inserted into the list is equal for each transaction trace, regardless if the sample size is full or not. For details of the insertion process please refer to FIG. 4a.

Separating the incoming transaction trace records per their extracted domain identifier represents a first grouping of incoming transactions to form groups of transactions that e.g. share the same application or application vendor. As an example, two application vendors "A" and "B" may provide two e-commerce applications accessible via servers "shopA" and "shopB". The domain separation performed for incoming transactions provides different and independent anomaly detection and alerting for both applications/application vendors. Other domain input data 202 available in transaction trace records 103 may be used as to determine the domain for a transaction trace record. Examples for such other domain input data include portions of a path or a query string of an URL corresponding to a transaction trace record, or for transactions not triggered by a HTTP request sent by a web browser and that consequently are not corresponding to an URL, another identifier captured by the agent that recognized the start of the transaction, like the domain name of the host computing system running the process on which the transaction was started.

The extraction of a domain identifier out of transaction trace records may be performed using a set domain extraction rules that define which portions of data in a transaction trace are used as input for the domain determination and that define how those portions of the trace data are processed to create a domain identifier.

All monitoring servers 105a to 105c of the cluster 104 may receive transaction traces with different domain input data 202 and create local time slot sample buffers 210 in their local per domain and timeslot sample repository 107a to 107c. A domain responsibility 109a to 109c is assigned to each monitoring server in the cluster. The domain responsibilities define which monitoring server is responsible to accumulate and process transaction trace data for specific domains. An example domain responsibility setting for a monitoring sever cluster 104 consisting in the three monitoring servers 105 "A", "B" and "C" and the domains "1", "2", "3", "4" and "5", the domain responsibility of "A" may be domain "1" and "2", for "B" it may be "3" and "4" and for server "C" it may be "5". For each domain, exactly one monitoring server is responsible, and one monitoring server may be responsible for multiple domains. The assignment of domain responsibilities to monitoring servers may be performed in a way that requires minimal domain responsibility changes on a change of the set of monitoring servers of the cluster. Synchronization techniques using the rendezvous hashing algorithm may be used for the assignment of domain responsibilities to different monitoring servers. A more detailed description of the update of domain responsibility on adding a server to the cluster or removing one from the cluster can be found in FIG. 3.

The monitoring servers 105a to 105c identify cyclically, with a sliding window update frequency (e.g. each minute, 5 minutes or 10 minutes), for all local time slot sample buffers 210 in their local per domain and timeslot sample repository 107, the monitoring server 105 which is responsible for the domain of the local time slot sample buffer. The monitoring servers cyclically exchange 108 their local time slot sample buffers in a way that all local time slot sample buffers for a specific domain are sent to the monitoring server that is responsible for the domain. Received local time slot sample buffers with a specific domain are stored in a time slot buffer list 222 of a global sliding window buffer 220 corresponding to the specific domain, i.e. the domain 221 of the global sliding window buffer 220 matches the domain 211 of the local time slot buffers 210 stored in its time slot buffer list 222. The global sliding window buffer 220 are stored in a global per domain sliding window sample repository 110a to 110c of the receiving monitoring server. After the sampling data exchange 108 is finished, the local per domain and sample repositories 107a to 107c of all monitoring servers are cleared to receive new transaction trace data for the next sliding window period.

After the local time slot sample buffers are exchanged between the monitoring servers and all domain specific transaction trace data samples of the last sliding window are available in the global per domain sliding window sample repository 110 of the monitoring servers according to their domain responsibility 109, the data in the global per domain sliding window sample repositories is processed to create input for the reference data creation and to perform anomaly tests by comparing the current data with corresponding historic reference data.

In a first step classification input data 203 is extracted from the transaction trace records stored in the global sliding window buffers and a classification is determined for each transaction trace. The classification of transaction traces is conceptually similar to the classification and categorization process described in U.S. patent application Ser. No. 15/227,029 "Method And System For Real-Time, Load-Driven Multidimensional And Hierarchical Classification Of Monitored Transaction Executions For Visualization And Analysis Tasks Like Statistical Anomaly Detection" by Greifeneder et al. which is included herein by reference in its entirety. The classification data of a transaction trace represents a most specific coordinate set in a multidimensional and hierarchic classification space. After the classification of the sampled per domain transaction traces is finished, a set of transaction categories with the highest transaction frequency within the last sliding window is calculated by the relative category size based category filter 112. The task performed by the relative category size based category filter is similar to task performed by the historic top category extractor described in U.S. patent application Ser. No. 15/227,029. As the top category extractor, the category size based category filter receives a set of transaction traces containing classification parameters that identify concrete coordinate points in a multidimensional and hierarchic classification space, and identifies those transaction categories with the highest transaction frequencies. A transaction category is identified by coordinate points in a multidimensional and hierarchic classification space, similar to an individual transaction, but in contrast to an individual transaction, some or all coordinate dimensions of a transaction category may be generic. The difference between a concrete and a generic coordinate value is best explained by example. A hierarchic classification dimension "web browser" may provide the hierarchy levels "all", "name" and "version", where the hierarchy level "all" only contains the value "all" which represents all web browsers, the level "name" may contain values for different types of web browsers, like Microsoft Internet Explorer®, Firefox or Google Chrome® and the level "version" identifies concrete web browsers of a specific type and a specific version. An individual transaction described by a transaction trace is always executed using a specific browser type of a specific version, but a transaction category may subsume transaction traces executed using a web browser of a specific type, regardless of the concrete version of the web browser.

The relative category size based category filter 112 performs a top-down search for all transaction categories containing a minimum percentage (e.g. 1%, 2% or 5%) of all transactions contained in each global sliding window buffer 220 in the global per domain window sample repository. Each global sliding window buffer represents the sampled transaction traces of the last sliding window that correspond to a specific domain.

It is noteworthy that the maximum number of transaction traces in a global sliding window buffer 220 is defined by the size limit of the local time slot sample buffers multiplied by the number of monitoring server in the monitoring cluster, as each monitoring server provides a maximum of one local time slot buffers per sliding window for each transaction domain, and each of this local time slot buffers contains a limited number of transaction traces.

The top-down search for categories with a transaction frequency higher than a specific threshold may be performed as follows. Starting with the top-level category which has the most generic coordinate value in all coordinate dimension, recursively move each coordinate dimension to the next specific hierarchy level, check for all values of the next specific hierarchy level if the frequency is higher than the threshold and add those coordinates for which the frequency is higher to a result. Skip coordinates with a lower frequency and all coordinates descending from those coordinates.

After the transaction categories with a minimum relative transaction frequency during the last sliding window period are identified, the sliding window reference data extraction module 113 creates for each of those transaction categories a sliding window reference data record 117 by analyzing the transactions matching each category.

A sliding window reference data record contains data to identify a specific domain, category and sliding window period, statistical data describing the performance and functional behavior and execution context data of the transactions of the corresponding category during the corresponding sliding window period. A detailed description of a sliding window reference data record can be found in FIG. 2.

Sliding window reference data records created by all monitoring servers are stored in a central sliding window reference data repository 116. A reference data update process cyclically (e.g. each day, each week etc.) processes the sliding window reference data records 117 available in the sliding window reference data repository to create execution context aware reference data 121 representing an overall reference period (e.g. last day, same day in last week, all days in last week etc.). A first step of the reference data update process uses a visibility time based category filter 118, which selects those categories for which sliding reference data records are available that cover a minimum percentage of the overall reference period. Each sliding window reference data record represents a specific category during a specific sliding window period. Only if sufficient sliding reference data records are available for a specific category that the time represented by their combined sliding window period covers a time period that is bigger than a specific fraction (e.g. 20%, 40%, 50%, 60% etc.) of the overall reference period, the specific category is used for further reference data calculation.

As an example, an overall reference period may cover a duration of 24 hours and sliding window periods may cover a duration of 10 minutes. For transaction category "A", 120 sliding window reference records may be available, for the overall reference period, covering 120×10 minutes or 20 hours of the overall reference period. Sliding windows for transaction category "A" cover 83% of the overall reference period, therefore transaction category "A" may be selected by the visibility time based category filter. For transaction category "B", only 50 non-overlapping sliding windows reference records may be available, covering only 35% of the overall reference period, therefore transaction category "B" may be rejected by the visibility time based category filter.

The visibility time based category filter 118 assures that singular, burst like events, where a large amount of transactions was processed during a short period of time do not distort the reference data. Only categories which received at least minimum relative percentage of transactions during a minimum fraction of the reference period are considered for the calculation of the overall reference data.

The execution context aware reference data extraction module 119 receives the sliding window reference data records 117 for the categories selected by the visibility time based category filter 118 and uses the sliding window reference data records corresponding to these categories to create an execution context aware reference data record 121 for each category. Each sliding window reference data record represents a snapshot of a set of transactions, and contains statistical data describing the performance and functional behavior of those transactions, e.g. statistical data describing the response time of those transactions or the probability that one of those transactions failed. In addition, the sliding window reference data contains data describing the execution context data of those transactions, like e.g. the number of concurrently executed transactions. The performance or functional behavior data and the execution context data of a sliding window reference data may be considered as two-dimensional data points, where one dimension denotes the execution context and the other dimension denotes the performance or functional behavior for the specific execution context. The execution context aware reference data extraction unit analyzes those data-points to generate statistical reference data representing the whole reference period, and to identify dependencies between performance or functional behavior and the execution context. As an example, a transaction load threshold may be determined below which the "cold cache" effect has a major impact on transaction response time and the response time starts to increase with decreasing transaction load. This threshold may e.g. be used to skip further anomaly detection processing when the concurrent transaction load of a current sliding window is below this threshold. A detailed description of the detection of dependencies of performance or functional transaction behavior and transaction load can be found in FIG. 5.

The results of the execution context aware reference extraction module 119 are stored in form of execution context aware reference data records 121 (for details please see FIG. 2) in a central overall reference data repository 120.

The execution context aware reference data records are used by the execution context aware anomaly detection and alerting module 114 to determine if transaction executions recorded during a current sliding window differ statistically significant from transaction executions from the reference time period.

Referring now to FIG. 2 which conceptually describes data records to store transaction trace data during different processing stages and to store sliding window and overall reference data.

A transaction trace record 103 as shown in FIG. 2a may be used to store transaction trace data extracted from monitoring data provided by multiple agents monitoring the execution of distributed transactions. The monitoring of transaction executions by agents and the extraction of transaction trace data out of this monitoring data may be performed according to the teachings of U.S. Pat. No. 8,234,631 "Method and System for Tracing Individual Transactions at the Granularity Level of Method Calls Throughout Distributed Heterogeneous Applications without Source Code Modifications" by Greifeneder et al. which is included herein by reference in its entirety. A transaction trace record 103 may contain but is not limited to a description and identification data section 201, a performance monitoring data section 204 and a functional monitoring data section 205. The description and identification data section 201 may contain but is not limited to domain input data 202 which may be used to determine the transaction domain to which a specific transaction trace belongs and a category input data 203 containing data corresponding to different classification dimensions, like data describing the geographic location of a browser that initiated the transaction, type and version of the browser, type and version of the operating system used to execute the browser or type and bandwidth of the network connection used to connect the browser with the internet. Both domain input data 202 and category input data 203 may be captured by agents 102 during transaction monitoring.

Performance monitoring data 204 may contain data describing the execution performance of individual method executions being part of a transaction execution, like the start and end time of specific method executions, the duration of a method execution including and excluding the execution time of nested method calls, the overall transaction execution time or the transaction response time.

Functional monitoring data 205 may contain data captured from agents that indicate the success of a specific transaction execution, like the occurrence of exceptions during the execution of the transactions or specific method return values or response codes indicating the success status of the execution of methods or the handling of requests.

Local time slot sample buffers 210 as shown in FIG. 2b may be used by monitoring servers to store sample sets of transaction traces representing a received stream of transaction traces for a specific transaction domain during a specific time period. A local time slot sample buffer 210 may contain but is not limited to a domain field 211 storing data to identify a specific transaction domain, a time slot field 212 used to specify the time slot described by the buffer, e.g. by specifying a start and an end time of the time slot, a limited size sample list 213 containing transaction traces 103 of the specific domain that were executed during the specific time slot and a transaction count field 214 which may be used to count the number of transaction trace records used to create the local time slot buffer.

Global sliding window buffers 220 as shown in FIG. 2c may be used by monitoring servers to accumulate received local time slot buffers for a specific transaction domain. A global sliding window buffer may contain but is not limited to a domain field 221 identifying a specific domain and a time slot buffer list 222 containing the local time slot buffers 210 for the specific domain and for a specific time slot from all monitoring servers 105 of the monitoring server cluster 104.

A sliding window reference data record 117 as shown in FIG. 2d may be used to store intermediate reference data extracted out of transaction trace data of a global sliding window buffer and provides reference data representing the sampled transaction traces for a specific domain and a specific time slot or sliding window period from all monitoring servers of the cluster. A sliding window reference data record 117 may contain but is not limited to a domain field 230 containing data that uniquely identifies a transaction domain, a sliding window period field 231, identifying a specific sliding time window, e.g. by its start and end time, a category field 232 identifying the transaction category described by the sliding window reference data record, e.g. by the classification dimension values of the category, a context data section 233 containing data describing the transaction execution conditions during the sliding window, and a statistical reference data section 235 containing statistical data that represents the performance and functional behavior of the transactions executed during the specific sliding window that match the specific transaction category and transaction domain.

The context data section 233 may contain data describing the execution context of transactions of the specific transaction domain and category during the specific sliding window period described by the sliding window reference data record. The context data 233 may contain but is not limited to a transaction load field, which may describe the number of transactions of the specific domain and category that were executed during the sliding window. Other recorded execution context data may include the average CPU load or memory consumption of computer systems or processes executing those transactions during the sliding window period.

The per window statistical reference data section 235 may contain but is not limited to quantile data 236, describing the statistical distribution of performance related measurements, like transaction response times in form of quantile data 236 and error rate data 237 describing the probability that a transaction execution corresponding to the sliding window reference record 117 is erroneous. Quantile data 236 may be provided in form of estimated values for specific quantile levels (e.g. 0.1 quantile, median or 0.9 quantile), or intermediate data generated by quantile estimation algorithms that may late be used to calculate estimated values for arbitrary quantile levels. Quantile data may also contain data describing the quality of the quantile estimations, e.g. in form of confidence intervals for a specific confidence level. A confidence interval defines a range around an estimated value which contains the real value with a specific probability or confidence level. Typically, the number of observations used to calculate an estimated value reduces the size of the confidence interval for a given confidence level. As an example, a confidence interval may be required for an estimated statistical value which contains the real value with a probability of 95%. With increasing number of observations that are used to calculate the estimated, the quality of the estimate will increase and the size of the confidence interval will decrease.

The error rate data 237 may contain data describing an estimation for the probability that a transaction corresponding to the sliding window reference record is erroneous and a confidence interval describing the quality of this estimate. The error rate data 237 may also contain the number of erroneous transaction executions corresponding to the sliding window reference record.

An execution context aware reference data record 121 as shown in FIG. 2e may be used to store reference data representing a whole reference period consisting in multiple sliding window periods. An execution context aware reference data record 121 may contain but is not limited to a domain 240 identifying a corresponding transaction domain, a reference period 241 specifying the reference period described by the record, e.g. in form of a start time and an end time, a category 242 identifying a corresponding transaction category, a context conditions section 243 defining transaction execution conditions that may influence the execution of statistical tests to identify anomalies of current transaction executions or the notification of identified anomalies and an overall statistical reference data section 245 containing statistical data reference data representing the reference period. The reference period 241 may describe a specific time span in the past, like the last day, the last week, the same day of the last week or the like. The context conditions section 243 may contain data that can be used to determine if anomaly tests should be performed on a set of current transactions. As an example, the context conditions may contain a minimal transaction load field 244 which specifies the minimal number of transactions that are required in the set of current transactions for an anomaly test. The minimal transaction load 244 may be determined by the analysis of multiple sliding window reference data records corresponding to the execution context aware reference record to identify dependencies between transaction load and transaction execution performance, e.g. caused by the "cold cache" effect. Anomaly tests for current transactions sets containing less transactions than the minimal transaction load may be skipped because it can be expected that those transactions are slower anyway due to the "cold cache" effect. Skipping anomaly tests in such load situations enables the usage of stricter thresholds and statistical test mechanisms without increasing the risk of false-positive alerts.

The overall statistical reference data 245 may contain but is not limited to quantile data 246 and error rate data 247 extracted from corresponding statistical reference data of sliding window reference data records used to create the execution context aware reference record. The quantile data 246 of an overall statistical reference data record 245 of an execution context aware reference data record may contain data representing an aggregation of the quantile data 236 of per window statistical reference data records 235 of the sliding window reference data records 117 used to create the execution context aware reference data record 121.

An exemplary process to create the aggregated quantile data 236 may first select those sliding window reference data records 117 with a sliding window period 231 falling into reference period 241 of the execution context aware reference record 121 which also have a transaction load 234 which is higher than the minimal transaction load 244 of the execution context aware reference data record. Quantile data 246 for the overall statistical reference data 245 may then be created out of the quantile data 236 of the selected sliding window reference data records 117. To create this aggregated quantile data, e.g. for a quantile with a specific level (e.g. 0.5 quantile or 0.9 quantile), the smallest value may be determined which is higher than a specific percentage (e.g. 95% or 99%) of the quantile values with the same specific level from the selected sliding window reference data records. The determined value represents the value for the specific quantile level for the overall observation period and may be stored as the value for the specific quantile level in the quantile data 246 of the corresponding overall statistical reference data 245.

A detailed description about determining a minimal transaction load and overall quantile reference data out of multiple sliding window reference data records can be found in FIG. 5. Some embodiments may instead of or in addition to separated context conditions and quantile data store a function describing the dependency between transaction load and quantile data in execution context aware reference data records. The determination of this function is also shown in FIG. 5.

Referring now to FIG. 3 which conceptually describes the processing required after adding a monitoring server to or removing a monitoring server from the cluster to maintain an equal distribution of domain responsibilities over the monitoring servers of the clusters. Typically, a transaction domain represents a significant portion of the transaction traces processed by the monitoring system and it is desired to distribute the responsibility for transaction domains equally amongst the monitoring servers. It is expected that this also distributes the received transaction traces equally amongst the monitoring servers.

The process starts with step 301 when a monitoring server joins the cluster or a monitoring server is removed from the cluster. Following step 302 reconfigures the domain responsibilities of all monitoring servers that are now in the cluster. Afterwards the process ends with step 303. It is desired to perform the reconfiguration of domain responsibilities in a way that only affects a minimum number of domain responsibilities, e.g. in case of a removed server, only distribute the responsibilities of the removed server evenly to the remaining monitoring servers without changing the existing domain responsibilities of those servers, or in case of an added monitoring server, move a fraction of the domain responsibilities of the monitoring servers that are already in the cluster to the new monitoring server, without changing the other domain responsibilities. Rendezvous hashing (see e.g. https://en.wikipedia.org/wiki/Rendezvous_hashing) may be used to reconfigure domain responsibilities after adding or removing a monitoring server with minimal change of existing domain responsibilities. Alternatively, other hashing algorithms that also fulfill the minimal responsibility change requirement may be used. One example for such hashing algorithm is consistent hashing (see e.g. https://en.wikipedia.org/wiki/Consistent_hashing) without leaving the spirit and scope of the disclosure. The techniques end mechanisms described here are also applicable if another hashing algorithm that the fulfills the minimal responsibility change requirement is used, but for brevity, only rendezvous hashing is discussed here.

To implement a rendezvous hashing approach, the monitoring severs may agree on a hash function with two parameters, the first parameter identifying a monitoring server, the second parameter identifying a transaction domain. The monitoring server that is responsible for a specific domain is determined by selecting the monitoring server for which the hash function applied on the parameter identifying the monitoring server and the parameter identifying the transaction domain has the highest value. In case a monitoring server is removed, each of the remaining monitoring servers may independently first determine the transaction domains of the removed server (combinations of parameter identifying the leaving monitoring server and transaction domains that produce a higher hash value than combinations with parameters identifying remaining monitoring servers), identify their additional transaction domain responsibility (hash value for combination of parameter identifying current monitoring server and parameter identifying transaction domain higher than hash values for other monitoring server and the transaction domain identifier) and store the updated transaction domain responsibility. In case a monitoring server joins the cluster, those transaction domains may be identified for which the hash value of the domain identifier combined with the identifier for the new monitoring server has the maximum value as those transaction domains for which the new monitoring server is responsible. With the rendezvous hashing approach, each monitoring server of the cluster can independently determine the monitoring server which is responsible for a specific transaction domain, and in case the cluster size changes, the number of changed transaction domain responsibilities is minimized.

Referring now to FIG. 4 which provides flow charts that conceptually describe the processing of incoming transaction trace data to generate sliding window reference data.

The processing of a received transaction trace record by a monitoring server is described in FIG. 4a. The process starts with step 401 when a new transaction trace record 103 is available at a monitoring server 105. Subsequent step 402 extracts a transaction domain identifier from the transaction trace record and queries the local per domain timeslot sample repository 107 for a local time slot buffer 210 with a domain 211 matching the domain identifier extracted from the received transaction trace record. In case no matching local time slot buffer exists in the repository 107, a new one is created, its domain 211 is set to the domain identifier extracted from the received transaction, its transaction count 214 is set to 0 and the new local time slot buffer is inserted into the local per domain timeslot sample repository 107. Subsequent decision step 403 checks if the limited size sample list 213 already contains the maximum number of transaction traces. The maximum number of transactions for local time slot buffers 210 may be set according to the expected transaction rate and the memory capacity of the monitoring servers. Exemplary sample buffer limits include 1000, 5000 or 10000 transactions. In case the limit of the sample list 213 is not reached, step 405 is executed which inserts the received transaction trace record into the sample list 212. Some embodiments may, before inserting the received transaction trace record into the sample list, create a reduced version of the received transaction trace records that only contains data that is relevant for the calculation of reference values and then insert the reduced transaction trace records into the sample list instead of the received transaction trace records. Subsequent step 406 increments the transaction count 214 of the local time slot sample buffer and the process then ends with step 407. In case decision step 403 determines that the buffer is already full, step 404 is executed which determines whether the new transaction trace record should not be placed in the sample buffer or should replace a randomly chosen transaction trace record that is already in the buffer. Step 403 may use a reservoir sampling strategy (see e.g. https://en.wikipedia.org/wiki/Reservoir_sampling) to determine whether a new transaction trace should replace a transaction that is already in the sampling buffer. A reservoir sampling strategy assures that the probability that a transaction trace record is placed in the sampling is the same for all transactions, regardless if they were received while the sampling buffer is full or not. According to the reservoir sampling strategy, transaction trace records are added to the buffer until the buffer is full and the received transactions are counted. After the buffer is full, for each new received transaction a random number ranging from 1 to the count of received transactions (including the new received transaction) is generated. If the random number is smaller than or equal to the buffer size, the new transaction replaces the transaction with the index of the random number. Otherwise, the new transaction is not added to the sample. This gradually decreases the probability that a new transaction trace record is added to the sample, and it also decreases the probability that transactions that are already in the sample buffer are replaced. The probability that a transaction is in the sample buffer is 1 in case the number of received transactions is smaller or equal to the buffer size and (buffer size)/(number of received transactions) otherwise. The probability that a transaction is in the sample buffer is equal for all received transactions.

After step 404 is finished, step 406 is executed which increments the transaction count. The process then ends with step 407.

The exchange of local time slot sample buffers 210 between monitoring servers 105 according to their transaction domain responsibility 109 is shown in FIG. 4b. The process is executed by each monitoring server in the monitoring cluster and starts with step 410, when the sliding window time slot (e.g. 1 min, 5 min or 10 min) is elapsed. Subsequent step 411 is executed which determines for all local time slot buffers 210 in the local per domain and timeslot sample repository 107 the monitoring server that is responsible for the domain 211 of the local time slot buffer 210. Rendezvous hashing methods as describe before may be used to determine the responsible monitoring server. After the monitoring servers that are responsible for the domains are determined, following step 412 sends the local time slot sample buffers 210 to their responsible monitoring sever. Afterwards step 413 clears the local per domain and sample repository 107 and the process ends with step 414. After the execution of process 4b, all local time slot sample buffers 210 of all monitoring servers are sent to those monitoring servers that are responsible for the transaction domain of those local time slot sample buffers 210.

The processing of incoming local time slot sample buffers 210 by monitoring servers that are responsible for the transaction domain of the local time slot sample buffers is described in FIG. 4c. The process starts with step 420 when a monitoring server receives a local time slot sample buffers and continues with step 421 which stores the incoming local time slot sample buffer in the time slot buffer list 222 of the global sliding window buffer 220 with a domain 221 matching the domain of the incoming local time slot buffers 210. In case no global sliding window buffer with a domain matching the domain of the incoming local time slot sample buffer exists in the global per domain sliding window repository, a new global sliding window buffer may be created, its domain may be set to the domain of the incoming local time slot sample buffer, the incoming local time slot sample buffer 210 may be stored in the time slot buffer list 222 of the created global sliding window buffer 220 and the created global sliding window buffer may be stored in the global per domain sliding window repository 110. The global sliding window buffers 220 are stored in the global per sliding window sample repository 110 of the receiving monitoring server. The process then ends with step 422.

The process of cyclically creating sliding window reference data records 117 using data from global sliding window buffer records 220 is described in FIG. 4d. The process is executed by all monitoring servers for all domains in their domain responsibility. It starts with step 430 when all local time slot buffers 210 from all monitoring servers are exchanged after a sliding window has elapsed and when all local time slot sample buffers 210 are stored in global sliding window buffer records of monitoring servers according to their transaction domain responsibility.

Following step 431 fetches the transaction sample data for the currently processed transaction domain, e.g. by fetching the global sliding window buffer 220 with a matching domain 221. Subsequent step 432 identifies those transaction categories that contain at least a specific percentage (e.g. 2% or 4%) of all sampled transactions for the ending sliding window. The number of all sampled transactions may be determined by summing-up the number of transaction traces in the limited size sample lists 213 corresponding to the current transaction domain.

As described in described in U.S. patent application Ser. No. 15/227,029, transaction traces may be categorized according to a multidimensional and hierarchic classification space. Example dimensions of this classification space may e.g. contain but are not limited to a dimension determining the geographic location of a web browser on which a transaction was initiated, a dimension determining the type of the web browser or a dimension determining the type of the performed transaction. The hierarchies of those dimension may determine how exact a transaction category identifies matching transaction for specific classification dimension. As an example, a geographic dimension may contain a top hierarchy level containing one possible value "*" representing all geographic locations of the world followed by a hierarchy level "continent" with possible values for each continent of the word and where each "continent" value represents a specific continent and so on. The higher, more generic hierarchy levels (e.g. "*") represent all possible values of lower, more specific hierarchy levels (e.g. values for all continents). Higher, more generic hierarchy levels typically cover more transaction traces than lower, more specific hierarchy levels. The hierarchy levels of different classification dimensions are independent, e.g. a transaction category may have the highest, most generic hierarchy level for the geolocation dimension and a value from the most specific hierarchy level for the browser type dimension.

The search for transaction categories containing at least a minimum transaction percentage may start with the most generic category which contains all transactions and then iteratively and top down search the classification space for descendant categories that also fulfill the minimum transaction percentage requirement. This process is best explained by an example. A two-dimensional classification space containing the dimensions "geolocation" and "browser" is considered, with a most generic transaction category "*/*" representing all geolocations and all browser and therefore also representing all transaction traces. In a first step, the "geolocation" dimension may be refined to the next hierarchy level which may group transactions according to a continent. Then, categories for all combinations describing a specific continent and all browsers may be analyzed to determine which of those fulfill the minimum transaction criteria. Continent categories fulfilling the criteria may further be refined according to the next hierarchy level "country" etc. The same iterative refinement and check for the minimum transaction criteria is performed for the "browser" criteria until all transaction classification combinations and therefore all transaction categories fulfilling the minimum transaction criteria are found.

Typically, agents 102 distribute created transaction traces equally to monitoring servers of the cluster. Therefore, it can be expected that the number of transaction traces received by each local time slot buffer is similar. However, it may be the case that the number of received transaction traces for a transaction domain deviate between monitoring servers. In such situations, the transaction counts 214 of local time slot sample buffers from different monitoring servers deviate. To compensate this, transaction traces from full local time slot buffers may be assigned a sample weight calculated as (transaction count)/(sample buffer size). This sample weight may be used for the determination of transaction categories with a minimum transaction frequency. Sampled transactions may not be counted as one but their count may be modified by the sample weight. As an example, a transaction trace from a full sample buffer with buffer size 100 and a transaction count of 250 may be assigned a count factor of 2.5. E.g. for the determination of transaction categories with a minimum percentage, each transaction from this sample buffer counts 2.5 times more than a transaction from a not full sample buffer or from a sample buffer with a transaction count of 100.

Following step 433 creates a sliding window reference data record 117 for each transaction category identified in step 432, sets its domain 230 to the currently processed transaction domain, its sliding window period field 231 to identify the time period of the elapsed sliding window, and the category field 232 to identify one of the categories determined by step 432.

Afterwards, step 434 extracts, for each transaction category identified by step 432, execution context data 233 from the transactions corresponding to the category. More specifically, step 434 may select all sampled transactions corresponding to a currently processed category and calculate or estimate the number of transactions corresponding to the current transaction category and the current sliding window. The calculated or estimated number of transactions may be used as transaction load 234 of the currently created sliding window reference record. This value may be calculated by first determining for each sampled transaction the local time slot buffer in which it was stored, and then determine the sample rate of this local time slot buffer (i.e. the ratio between observed and sampled transactions as discussed earlier). In case a transaction was stored in a local time slot buffer which contains all observed transactions (i.e. limited size sample list is not full or transaction count smaller or equal to maximum sample size), then the transaction counts as one transaction for the calculation of the transaction load. If a transaction was stored in a local time slot buffer which contains less than the observed transactions (i.e. limited size sample list is full and transaction count is higher than maximum sample size), then the transaction is extrapolated by the sample rate (e.g. transaction count 214 divided by the sample size) and counts as one multiplied by the sample rate for the calculation of the transaction load.

Following step 435 analyzes the transaction trace records corresponding to identified transaction categories to create performance related statistical reference data describing e.g. the statistical distribution of the response times of transactions corresponding to the category and functionality related statistical reference data e.g. describing the probability that the execution of a transaction corresponding to the transaction category is erroneous.

Step 435 may use response time data of sampled transaction traces to calculate quantile data estimates describing the statistical distribution of the transaction response times. It may further analyze the relation between failed and not failed transactions under the assumption that the number of failed transactions follows a Binomial distribution to calculate a probability that a sampled transaction is erroneous.

The calculation of quantile data and error rate data may be performed according to the teachings of U.S. patent application Ser. No. 15/227,029 and U.S. patent application Ser. No. 14/338,707 "Method And System For Real-Time False Positive Resistant, Load Independent And Self-Learning Anomaly Detection Of Measured Transaction Execution Parameters Like Response Times" by Greifeneder et al. which is included herein by reference in its entirety.

Step 435 may calculate the required quantile values exactly, but variant embodiments may instead calculate estimates of the required quantile values. Various quantile estimation algorithms may be used by those variant embodiments, including but not limited to the t-digest algorithm (https://github.com/tdunning/t-digest/blob/master/docs/t-digest-paper/hito.pdf) or the p-square algorithm (https://www1.cse.wustl.edu/~jain/papers/ftp/psgr.pdf).

The calculation of quantile and error rate data may in addition consider different transaction counts 214 of local time slot sampling buffers 210 from different monitoring server. Samples with different sampling rates (ratio between all events and sampled events) need to be aligned to represent the same sampling rate before they can be combined. This would mean to randomly choose and discard transaction traces out of local time slot sampling buffers with a transaction count 214 lower than the local time slot sampling buffers with the highest transaction count until the sampling rate for all local time slot sampling buffers is equal. Afterwards, those samples can be combined.

In practice, however it is sufficient and provides acceptable results to combine samples without considering different sampling rate, calculate estimates for statistical parameters out of the combined samples and in addition monitor the deviation of the sampling rates. The results of statistical estimations may be adapted by altering the parameter describing the quality of the estimation to indicate a lower quality of the estimation, e.g. by increasing the confidence interval of the estimation result. The increase of the confidence interval may be proportional to the deviation of sampling rates. Some variant embodiments may only increase the confidence interval when the deviation of the sampling rates exceeds a certain threshold.

Step 435 then stores statistical performance and functional reference data in the created sliding window reference data record. Quantile data 236 may be stored in form of estimation values for individual quantiles (e.g. 0.5, 0.9 and 0.95 quantile) and corresponding estimation quality description data like confidence intervals or in form of compacted input data for quantile estimation algorithms, like e.g. supporting points that may later be used in combination with a quantile estimation algorithm to calculate arbitrary quantiles. Error rate data 237 may be stored in form of an estimated probability of erroneous transaction executions and a corresponding confidence interval. The sliding window reference data record 117 is stored in the sliding window reference data repository 116 and the process ends with step 436.

Referring now to FIG. 5 which shows a chart that illustrated the dependencies between transaction response times and transaction load. The x-axis of the chart denotes the transaction load, and the y-axis denotes the transaction response time. Each point in the chart (e.g. 501) represents a measurement taken from a sliding window reference data record 117 where the y-value represents the estimate of a specific quantile (e.g. 0.5 quantile) taken from the quantile data 236 of the reference data record and the x-value represents the transaction load 234 of the same sliding window reference data record. FIG. 5 visualizes measurements of all sliding window reference data records 117 of an overall reference period. The overall reference period covers a longer time range which includes periods with various load scenarios. In this example, the transaction load ranges from a minimum load 502 of ~1600 transactions per sliding window to a maximum load 503 of ~5100 transactions. The scatter-plot shows that the transaction response times in low load scenarios are generally higher than in high load scenarios. A function describing the graph 504 may be generated out of the scatter-plot data describing those transaction load/response time combinations for which at least a given percentage of the observations (e.g. 95% or 99%) is below the graph. Various techniques are known in the art to extract a function out of scatter-plot data. One of those techniques is the "line of best fit" approach that identifies a line through a cloud of data points for which divides the data points per a deserted proportion, e.g. 90% of the data points below and 10% above the line. To get the function 504, the data points of FIG. 5 may be separated in consecutive load area sections, e.g. the first load area section covering the load area from 1500 to 2000, the second section from 2000 to 2500 and so on. A "line of best fit" may be calculated for the data points in each load section and the per load section "lines of best fit" may afterwards be combined into one overall function 504 representing the whole scatter-plot data. The number of load area sections and the area covered by individual sections may vary.

The "normal region" 505 area below the graph represents normal transaction load/response time combinations and the "abnormal region" 510 represents transaction load/response time combinations that are considered abnormal and for which alerts should be triggered. Analysis of the graph also shows that it has an area with relative steep gradient in the low load area, followed by a sharp bend and an area with a flat gradient in the high load area. The assumption is that the high gradient in the low load area is caused by an influence of the "cold cache effect" on the transaction response time and the bend in the graph represents a threshold load level at which "cold cache" influence becomes negligible. The area below this load threshold value (i.e. the area of the chart in FIG. 5 that is left of the load cutoff 507) may be denoted "cold cache load area" 509. The steep bend or maximum gradient change 506 of the graph may be determined using mathematical curve sketching methods (e.g. maximum value of second derivative of the graph). Alternatively, the load cutoff may be calculated by starting at a candidate transaction load for which a certain percentage (e.g. 50%) of all data points 501 has a higher transaction load. A candidate reference value may then be calculated for those data points with a higher transaction load than the candidate transaction load. The candidate transaction load may then be gradually decreased, and a new candidate reference value may be calculated for each decreased candidate transaction load. The difference between consecutively calculated candidate reference values may be calculated. In case the candidate reference value for the lower candidate transaction load is higher than the candidate reference value calculated for the higher candidate transaction load and difference of the candidate reference values exceeds a certain threshold, the candidate reference with the higher corresponding transaction load may be selected as reference value and the corresponding candidate transaction load may be selected as load cutoff value. Various transformations may be performed on the data points before the load cutoff value is calculated to ease the calculation process. Those transformations include but are not limited to a logarithmic transformation of the response time values and a range value transformation of the load frequency values.

The transaction load corresponding to this maximum gradient change may be used as load cutoff point 507, which indicates a minimum requirement transaction load for current transactions to perform performance related anomaly tests. This load cutoff point may be stored as minimal required transaction load 244 in execution context aware reference data records.

After the load cutoff point is determined, a reference value 508 for the specific quantile may be determined as a value for which at least a specific percentage (e.g. 95%, 99%) of quantile measurements with a corresponding transaction load that is higher than the load cutoff 507 is lower than the reference value. The determination of the reference value is exemplary described in the context of the chart shown in FIG. 5. FIG. 5 shows that only data points 501 with a higher transaction load than the load cutoff 507 (i.e. that are on the right side of the load cutoff) are considered for the calculation of the reference value, and the reference value is calculated as the smallest response time value that is higher than e.g. 95% of the response times of the considered data points.

This reference value may be stored as quantile data 246 of an execution context aware reference data record 121.

More specific, the y-value of all data points in the scatter-plot depicted in FIG. 5 represent values of quantiles of the same specific level (e.g. 0.5 quantile) from different sliding window reference data records representing an overall reference period and the x-values of those data points represent the transaction load of those sliding window reference data records. Consequently, multiple sets of data-points may be generated for different quantile levels and multiple load cutoff values and reference values may be calculated for those different quantile levels.

Some variant embodiments may instead of storing a reference value 508 and a load cutoff 507 store data representing the whole transaction load/response time graph 504 in execution context aware reference data records. Those variants may e.g. determine a function representing the transaction load/response time graph 504, this function may e.g. be specified in form of a set of support points in form of specific observed transaction load/response time pairs. Corresponding response time reference values for given transaction load values may be determined by interpolating the response time values from support points with the next higher and lower transaction load. In case a current transaction response time/transaction load scenario is received, e.g. in form of a sliding window reference data record, and a decision is required if this scenario represents an anomaly, the current transaction load may be used as input for the function representing the transaction load/response time graph, and the value of the function for this input may be used as reference value for the response time in an anomaly test.

Similar analyses may be performed for transaction functionality reference data like error rates to identify dependencies between transaction load and error rates and to adapt transaction functionality related anomaly detection accordingly.

Referring now to FIG. 6 which provides a flow chart that conceptually describes the creation of execution context aware reference data records 121 representing an overall reference period out of sliding window reference data records 117 recorded during that overall reference period. The process is executed for each transaction domain and starts with step 601 when existing overall reference data is outdated, and an updated version of the reference data is required. The overall reference data may be updated cyclically, e.g. once every day. Following step 602 identifies those transaction categories for which sliding window reference data records are available at least for a specific minimum percentage of the overall reference period. Sliding window reference data records 117 are cyclically created by monitoring servers every time a sliding window period elapses (e.g. every minute, every 5 minutes etc.) for transaction categories containing a minimum percentage of all transactions of the sliding window. In case a specific transaction category does not fulfill this minimum transaction percentage requirement for a sliding window period, no sliding window reference data record will be created for this category. Therefore, the availability of sliding window reference data records for transaction categories may vary over time periods covering multiple sliding window durations. By identifying those transaction categories for which sliding window reference data records 117 are available for at least for a specific minimum percentage of the overall reference period, step 602 identifies those transaction categories that contained at least a minimum percentage of all transactions during at least a minimum duration. This two-staged filtering of transaction categories considering both transaction frequency and the duration the transaction frequency persists, helps to eliminate the influence of "transaction bursts", where a large amount of transactions corresponding to specific transaction categories is executed during a short period of time (e.g. due to synthetic transaction load caused by load tests) which has no long-lasting impact on the monitored environment.

Following step 603 fetches the sliding window reference data records 117 for the transaction categories identified in step 602 and subsequent step 604 analyzes the fetched sliding window reference data records to determine dependencies between execution context data, like transaction load and performance or functional behavior of the monitored transactions as conceptually described in FIG. 5. More specifically, step 604 may generate scatter-plot like data sets as exemplary shown in FIG. 5 for different quantile levels and perform initial analysis steps of this data sets to e.g. generate functions (e.g. like function/graph 504) describing those data sets. The intermediate results created by step 604 may be used by subsequent step 605 to create context condition and overall statistic reference data 245 for the to be created execution context aware reference record.

Following step 605 calculates relevant execution context data for further anomaly detection, like a load cutoff 507 which is used as minimal transaction load 244. Afterwards, step 606 calculates performance reference data 246, e.g. in form of one or multiple reference values 508 and subsequent step 606 calculates a functional reference value 246, e.g. in form of an average or maximum error rate of the error rates 237 of all corresponding sliding window reference data records 117. The purpose of step 605 and 606 is to determine execution context condition, like e.g. a minimal required transaction load to perform anomaly checks and corresponding reference data for anomaly checks like data describing the probability that transactions executions are erroneous for functionality related anomaly checks or data describing the statistic distribution of transaction response times, like values for quantiles of specific levels (e.g. 0.5 quantile or 0.9 quantile) for performance related anomaly checks. The execution context conditions are determined by analyzing snapshot data describing provided by sliding window reference data records to identify execution conditions in which known and not relevant effects like the "cold cache" effect have a major influence on the monitored behavior. Only statistical reference data from sliding window reference records that fulfill the determined execution context conditions are used for the calculation of reference data. The calculated execution context condition and reference data represent the overall reference period.

In some variant embodiments, steps 605 and 606 may be combined and instead of creating separate execution condition and reference data store data describing one or more functions describing dependencies between execution conditions and reference values, like data describing the graph 504 in FIG. 5.

The created data is stored in execution context aware reference data records 121, each execution context aware reference data record representing a specific transaction category in a specific transaction domain and the execution context aware reference data records are stored in the overall reference data repository 120. The process ends with step 607.

Referring now to FIG. 7, which contains a flow chart that conceptually describes the process that cyclically checks if the performance or functional behavior of current transaction executions represents an anomaly compared to existing reference data. The processing described in FIG. 7 may be performed by the execution context aware anomaly detection and alerting module 114 of the monitoring servers 105. The process is executed cyclically, e.g. with the sliding window frequency, for each transaction domain by monitoring servers according to their domain responsibility. The process starts with step 701, e.g. after the monitoring servers exchanged the local time slot sample buffers as described in process 4c and global sliding window buffer records 220 representing current transaction executions are available. Following step 702 determines those transaction categories for which reference data is available in form of execution context aware reference data records and for which the global sliding window buffer records contains sufficient transaction trace samples to perform statistical analyses. Typically, such analyses are useless for less than 30 or 50 samples. As an example, step 702 may fetch all execution context aware reference data records 121 for the current transaction domain and determine the number of transactions in the global sliding window buffer record matching the categories 242 of execution context aware reference data records 121. More specifically step 702 may fetch all execution context aware reference data record with a domain 240 matching the currently processed domain, and determine for the category 242 of each fetched execution context aware reference data record the number of current transactions that fall in the same transaction category. Only transaction categories of execution context aware reference data records for which sufficient current transactions are available in the global sliding window buffer record 220 are considered for further anomaly processing.

Following step 703 calculates the current execution context data for the transaction categories identified in step 702. Step 703 may e.g. determine the count of transactions in the global sliding window buffer record matching a transaction category and correct this count by the sampling factor of the corresponding local time slot sample buffers (e.g. if sample buffer is full, multiply count by transaction count 214 and divide by buffer size, as more transactions were executed than sampled. In case of multiple local time slot buffers, count transaction by local time slot buffer, apply local time slot buffer 210 specific sample rate and then add individual counts).

Following step 704 calculates current statistical data describing performance and functional behavior for each transaction category identified in step 702 using current transaction trace data from the global sliding window buffer 220. Performance related statistical data may be calculated in form of quantile estimates and transaction functionality related statistical data in form of error rate estimates.

Subsequent step 705 fetches corresponding reference data in form of execution context aware reference data records for each category identified in step 702 and for which current execution context and statistical data was created in steps 703 and 704, and following step 706 determines for each identified transaction category if the current performance or functional behavior represent an anomaly considering the current execution conditions. Step 706 may in some embodiments use a load cutoff or minimal transaction load 244 to compare it with the current load situation and only proceed anomaly detection in case the current transaction load exceeds the load cutoff.

In other embodiments, step 706 may use a function describing transaction load/transaction response time dependencies that receives a given transaction load value as parameter and provides a transaction response time reference value for the given transaction load value to get an appropriate transaction response time reference value which may then be compared with the observed current transaction response time value to determine if the current transaction response time value represents an anomaly.

The determined statistical reference values may be increased by an absolute and a relative addition to further reduce the risk of false-positive alerts. As an example, a reference value for transaction response times may be increased by a constant value of 10 milliseconds or by a relative value of 5% of the original value, or by both the absolute and the relative value. The increased statistical reference values may then be compared with corresponding current statistical values. Typically, a current statistical value that is higher than the corresponding increased reference value indicates an anomaly.

Following step 707 notifies transaction categories for which an anomaly was detected, together with the type of the detected anomaly (e.g. performance related or functionality related anomaly). The anomaly notification may include but is not limited to presenting data describing the anomaly on a dashboard of a computer system, sending an email containing data describing the anomaly to an operator of the monitored application or a combination of both. The process then ends with step 708.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for detecting anomalies in a performance metric associated with transactions in a distributed computing environment, comprising:

receiving, by a given server computer, a plurality of previous transaction events resulting from transactions executed during an overall observation period, where each transaction event is derived from a given transaction and each transaction event includes a performance metric indicative of transaction execution and all of the previous transaction events fall into a given category;

segmenting the plurality of previous transaction events into observations windows, where each observation window is a fixed period of time within the overall observation period;

for each observation window in the overall observation period, determining a number of all transaction events in a given observation window;

for each observation window in the overall observation period, creating a window reference record in a data repository, where each window reference record includes a representative value for the performance metric during the given observation window and the number of all transaction events in the given observation window is stored as a transaction load during the given observation window;

identifying a dependency between the representative value for the performance metric and the transaction load for the given category from the representative values for the performance metric and the transaction load values of the window reference records, where, for a given transaction load value, the identified dependency determines a corresponding expected performance metric value;

storing the dependency as overall statistical reference data for the given category and the overall observation period receiving, by the given server computer, a plurality of current transaction events resulting from transactions executed in the distributed computing environment, wherein each current transaction event falls into the given category and includes a performance metric indicative of transaction execution, such that the plurality of current transaction events occurred more recently than the plurality of previous transactions events;

determining a representative value for the performance metric during a current observation window, where the representative value for the performance metric is derived from current transaction events falling into the current observation window; and detecting an anomaly in the performance metric during the current observation window;

in response to detecting existence of an anomaly, applying the identified dependency to a currently observed transaction load, thereby determining an expected performance metric for the currently observed transaction load; and suppress a notification of the anomaly when the expected performance metric matches the representative value for the performance metric during the current observation window.

2. The method of claim 1 further comprises receiving, by the given server computer, a plurality of current transaction events resulting from transactions executed in the distributed computing environment, wherein each current transaction event includes one or more classification parameters for the given transaction and a performance metric indicative of transaction execution, such that the plurality of current transaction events occurred more recently than the plurality of previous transactions events;

grouping the plurality of current transaction events into categories using the one or more classification parameters;

segmenting the plurality of current transaction events into observations windows, where each observation window is a fixed period of time within an overall observation period;

for a current observation window, identifying one or more categories amongst the current transaction events that fall within the current observation window, where the number of current transaction events associated with an identified category in the current observation window exceeds a minimum transaction window threshold;

for a particular identified category, retrieving the overall statistical reference data during a baseline overall observation period, where the overall statistical reference data includes a function that describes dependency between the representative value for the performance metric and the transaction load;

for the particular identified category, determining a number of current transaction events associated with the particular identified category in the current observation window;

for the particular identified category, determining a representative value for the performance metric during the baseline overall observation period from the function using the number of current transaction events associated with the particular identified category in the current observation window; and detecting an anomaly for the particular identified category by comparing the representative value for the performance metric during the current observation window to the representative value for the performance metric during baseline overall observation period.

3. The method of claim 2 where the function is defined by a load threshold and a reference value for the performance metric and where the value of the function equals to the reference value for the performance metric for received transaction load values above the load threshold and equals to a value indicating no anomaly for other received transaction load values.

4. The method of claim 1 further comprises capturing, by an agent instrumented in a monitored application, the plurality of current transaction events; and sending, by the agent, the plurality of current transaction events via a network to the given server computer.

5. The method of claim 4 further comprising receiving, by the given server computer, the plurality of current transaction events from the agent;

extracting, by the given server computer, a domain identifier from each of the current transaction events;

grouping, by the given server computer, the plurality of current transaction events according to the extracted domain identifier;

exchanging, by the given server computer, the grouped transaction events with other server computers, where the given server computer and each of the other server computers has a domain responsibility and where the exchange of the grouped transaction events is performed according to the domain responsibilities assigned to the given server computer and the other server computers.

6. The method of claim 5 further comprises assigning domain responsibility to the given server computer using rendezvous hashing, where the plurality of current transaction events are associated with a domain assigned to the given server computer.

7. The method of claim 5 further comprises assigning domain responsibility to the given server computer using consistent hashing, where the plurality of current transaction events are associated with a domain assigned to the given server computer.

8. The method of claim 4 wherein the plurality of current transaction events are sent by the agent to a cluster of monitor server computers, such that the plurality of current transaction events are distributed equally amongst the monitor server computers.

9. The method of claim 4 wherein the plurality of current transaction events are sent by the agent to a cluster of monitor server computers, such that a transaction count is maintained for each of the monitor server computers and the plurality of current transaction events are distributed according the transaction counts maintained for each of the monitor server computers.

10. The method of claim 1 wherein the performance metric is further defined as a response time for an application executing a portion of a given transaction executed in the distributed computing environment.

11. The method of claim 1 wherein the representative value for the performance metric is further defined as a quantile.

12. The method of claim 1 further comprises storing the plurality of current transaction events in a buffer with fixed size, where probability of storing a given current transaction event in the buffer is independent of the buffer being full.

13. The method of claim 12 further comprises
receiving a new current transaction event;
generating a random number in response to receiving the new current transaction event, where the random number is in a range from one to a number of current transaction events received by the given server computer;
replacing a particular current transaction event in the buffer with the new current transaction event when the random number is smaller than the size of the buffer, where the particular current transaction event has an index in the buffer equal to the random number; and
discarding the particular current transaction event when the random number is larger than the size of the buffer.

14. A non-transitory computer-readable medium having computer-executable instructions that, upon execution of the instructions by a processor of a computer, cause the computer to
receive a plurality of previous transaction events resulting from transactions executed during an overall observation period in a distributed computing environment and segmenting the plurality of previous transaction events into observation windows, where each transaction event is derived from a given transaction, each transaction event includes a performance metric indicative of transaction execution, each observation window is a fixed period of time with the overall observation period and all of the previous transaction events fall into a given category;
for each observation window in the overall observation period, determine a number of transaction events in a given observation window;
for each observation window in the overall observation period, create a window reference record in a data repository, where each window reference record includes a representative value for the performance metric during the given observation window and the number of transaction events in the given observation window is stored as a transaction load during the given observation window;
identify a dependency between the representative value for the performance metric and the transaction load for the given category from the representative values for the performance metric and the transaction load values of the window reference records serve as data points for the function;
store the dependency as overall statistical reference data for the given category and the overall observation period in a computer memory
receive a plurality of current transaction events resulting from transactions executed in the distributed computing environment, wherein each current transaction event falls into the given category and includes a performance metric indicative of transaction execution, such that the plurality of current transaction events occurred more recently than the plurality of previous transactions events;
determine a representative value for the performance metric during a current observation window, where the representative value for the performance metric is derived from current transaction events falling into the current observation window; and
detect an anomaly in the performance metric during the current observation window;
in response to detecting existence of an anomaly, apply the identified dependency to a currently observed transaction load, thereby determining an expected performance metric for the currently observed transaction load; and
suppress a notification of the anomaly when the expected performance metric matches the representative value for the performance metric during the current observation window.

15. The non-transitory computer-readable medium of claim 14 causes the computer to
capture, by an agent instrumented in a monitored application, the plurality of current transaction events;
send, by the agent, the plurality of current transaction events via a network to the given server computer;
receive, by a given server computer, the plurality of current transaction events from the agent;
extract, by the given server computer, a domain identifier from each of the current transaction events;
group, by the given server computer, the plurality of current transaction events according to the extracted domain identifier; and
exchange, by the given server computer, the grouped transaction events with other server computers, where the given server computer and each of the other server computers has a domain responsibility and where the exchange of the grouped transaction events is performed according to the domain responsibilities assigned to the given server computer and the other server computers.

16. The non-transitory computer-readable medium of claim 15 causes the computer to assign domain responsibility to the given server computer using rendezvous hashing, where the plurality of current transaction events are associated with a domain assigned to the given server computer.

17. The non-transitory computer-readable medium of claim 15 causes the computer to assign domain responsibility to the given server computer using consistent hashing, where the plurality of current transaction events are associated with a domain assigned to the given server computer.

18. The non-transitory computer-readable medium of claim 15 wherein the plurality of current transaction events are sent by the agent to a cluster of monitor server computers, such that a transaction count is maintained for each of the monitor server computers and the plurality of current transaction events are distributed according the transaction counts maintained for each of the monitor server computers.

19. The non-transitory computer-readable medium of claim 18 causes the computer to
receive, by the given server computer, a plurality of current transaction events resulting from transactions executed in the distributed computing environment, wherein each current transaction event falls into the given category and includes a performance metric indicative of transaction execution, such that the plurality of current transaction events occurred more recently than the plurality of previous transactions events;
determine a representative value for the performance metric during a current observation window, where the representative value for the performance metric is derived from current transaction events falling into the current observation window; and
detect an anomaly in the performance metric during the current observation window based in part on the overall statistical reference data for the given category.

20. The non-transitory computer-readable medium of claim 19 causes the computer to
capture, by an agent instrumented in a monitored application, the plurality of current transaction events;
send, by the agent, the plurality of current transaction events via a network to the given server computer;
receive, by the given server computer, the plurality of current transaction events from the agent;
extract, by the given server computer, a domain identifier from each of the current transaction events;
group, by the given server computer, the plurality of current transaction events according to the extracted domain identifier;
exchange, by the given server computer, the grouped transaction events with other server computers, where the given server computer and each of the other server computers has a domain responsibility and where the exchange of the grouped transaction events is performed according to the domain responsibilities assigned to the given server computer and the other server computers.

21. The non-transitory computer-readable medium of claim 20 causes the computer to assign domain responsibility to the given server computer using rendezvous hashing, where the plurality of current transaction events are associated with a domain assigned to the given server computer.

22. The non-transitory computer-readable medium of claim 20 causes the computer to assign domain responsibility to the given server computer using consistent hashing, where the plurality of current transaction events are associated with a domain assigned to the given server computer.

23. The non-transitory computer-readable medium of claim 20 wherein the plurality of current transaction events are sent by the agent to a cluster of monitor server computers, such that a transaction count is maintained for each of the monitor server computers and the plurality of current transaction events are distributed according the transaction counts maintained for each of the monitor server computers.

24. The non-transitory computer-readable medium of claim 19 causes the computer to store the plurality of current transaction events in a buffer with fixed size, where probability of storing a given current transaction event in the buffer is independent of the buffer being full.

25. The non-transitory computer-readable medium of claim 14 causes the computer to store the plurality of current transaction events in a buffer with fixed size, where probability of storing a given current transaction event in the buffer is independent of the buffer being full.

26. A computer-implemented anomaly detection system that monitors transactions in a distributed computing environment, comprising:
a transaction classifier residing on a given server computer and configured to receive a plurality of previous transaction events resulting from transactions executed during an overall observation period in the distributed computing environment and, in response to receiving the plurality of previous transaction events, segmenting the plurality of previous transaction events into observation windows, where each transaction event is derived from a given transaction, each transaction event includes a performance metric indicative of transaction execution, each observation window is a fixed period of time within the overall observation period, and all of the previous transaction events fall into a given category;
a category filter residing on the given server computer and interfaced with the transaction classifier, the category filter, for each observation window, determines a number of transaction events in a given observation window and creates a window reference record in a sliding window data repository, where each window reference record includes a representative value for the performance metric during the given observation window and the number of transaction events in the given observation window is stored as transaction load during the given observation window; and
an overall reference data extractor residing on the given server computer and interfaced with the sliding window data repository, the overall reference data extractor, for the overall observation period, identifies a dependency between the representative value for the performance metric and the transaction load and stores the dependency as overall statistical reference data for the given category and the overall observation period, wherein the transaction classifier, the category filter and the overall data extractor are executed by a processor on the given server computer.

\* \* \* \* \*